(12) United States Patent
Franzke

(10) Patent No.: US 8,582,585 B2
(45) Date of Patent: Nov. 12, 2013

(54) DISTRIBUTION DEVICE IN A SUBSCRIBER CONNECTION AREA

(75) Inventor: Jörg Franzke, Berlin (DE)

(73) Assignee: ADC GmbH, Berlin (DE)

( * ) Notice: Subject to any disclaimer, the term of this patent is extended or adjusted under 35 U.S.C. 154(b) by 1188 days.

(21) Appl. No.: 11/914,692

(22) PCT Filed: May 11, 2006

(86) PCT No.: PCT/EP2006/004420
§ 371 (c)(1),
(2), (4) Date: Jun. 19, 2008

(87) PCT Pub. No.: WO2006/122699
PCT Pub. Date: Nov. 23, 2006

(65) Prior Publication Data
US 2009/0129568 A1    May 21, 2009

(30) Foreign Application Priority Data

May 18, 2005  (DE) .......................... 10 2005 022 547

(51) Int. Cl.
*H04L 12/56* (2011.01)
(52) U.S. Cl.
USPC ............ 370/401; 370/400; 370/396; 370/352
(58) Field of Classification Search
None
See application file for complete search history.

(56) References Cited

U.S. PATENT DOCUMENTS

| | | | |
|---|---|---|---|
| 4,430,732 A * | 2/1984 | Saga et al. ..................... | 370/323 |
| 4,609,778 A | 9/1986 | Franklin et al. | |
| 4,833,708 A | 5/1989 | Goodrich | |
| 5,522,042 A | 5/1996 | Fee et al. | |
| 5,542,854 A | 8/1996 | Bowen | |
| 5,552,962 A | 9/1996 | Feustel et al. | |
| 5,754,404 A | 5/1998 | Biermann et al. | |
| 5,764,754 A | 6/1998 | Ortel et al. | |
| 5,790,546 A | 8/1998 | Dobbins et al. | |

(Continued)

FOREIGN PATENT DOCUMENTS

| | | |
|---|---|---|
| DE | 101 04 705 | 8/2002 |
| EP | 0 648 061 A2 | 4/1995 |

(Continued)

OTHER PUBLICATIONS

U.S. Appl. No. 11/914,680, filed Jul. 20, 2008 entitled "Active Distribution Device in a Subscriber Connection Area".

(Continued)

*Primary Examiner* — Marcus R Smith
*Assistant Examiner* — Mark A Mais
(74) *Attorney, Agent, or Firm* — Merchant & Gould P.C.

(57) ABSTRACT

The invention relates to a distribution device in the subscriber access area, comprising two changeover devices two switching matrices a DSLAM having associated splitter modules and at least one controller. The first changeover device includes m inputs, m first outputs and m second outputs, with a first and a second output having one associated changeover element by means of which an associated input can be selectively connected to the first or to the second output. The second changeover device includes m first inputs, m second inputs and m outputs, with a first input and a second input having one associated changeover element by means of which an associated output can be selectively connected to the first or to the second input. The controller switches the first and second changeover devices and switching matrices.

5 Claims, 1 Drawing Sheet

(56) References Cited

U.S. PATENT DOCUMENTS

| | | | |
|---|---|---|---|
| 5,903,372 A | 5/1999 | Czerwiec | |
| 5,905,781 A | 5/1999 | McHale et al. | |
| 5,949,763 A | 9/1999 | Lund | |
| 6,067,316 A | 5/2000 | Amrany et al. | |
| 6,148,006 A | 11/2000 | Dyke et al. | |
| 6,215,855 B1 | 4/2001 | Schneider | |
| 6,266,348 B1* | 7/2001 | Gross et al. | 370/493 |
| 6,325,636 B1 | 12/2001 | Hipp et al. | |
| 6,335,936 B1 | 1/2002 | Bossemeyer, Jr. et al. | |
| 6,349,123 B1 | 2/2002 | Kim | |
| 6,370,137 B1 | 4/2002 | Lund | |
| 6,370,149 B1 | 4/2002 | Gorman et al. | |
| 6,400,713 B1 | 6/2002 | Thomas et al. | |
| 6,477,238 B1 | 11/2002 | Schneider et al. | |
| 6,493,318 B1 | 12/2002 | Bare | |
| 6,597,689 B1* | 7/2003 | Chiu et al. | 370/354 |
| 6,625,019 B1 | 9/2003 | Steinman et al. | |
| 6,640,239 B1 | 10/2003 | Gidwani | |
| 6,674,756 B1 | 1/2004 | Rao et al. | |
| 6,754,329 B2 | 6/2004 | Teixeira | |
| 6,757,382 B1 | 6/2004 | Wilkes, Jr. et al. | |
| 6,819,746 B1 | 11/2004 | Schneider et al. | |
| 6,826,280 B1 | 11/2004 | Sajadi et al. | |
| 6,868,092 B1 | 3/2005 | Bell et al. | |
| 6,944,361 B2 | 9/2005 | Xue et al. | |
| 6,944,555 B2 | 9/2005 | Blackett et al. | |
| 6,954,463 B1 | 10/2005 | Ma et al. | |
| 6,977,925 B2 | 12/2005 | Pittman | |
| 7,092,364 B1 | 8/2006 | Franklin et al. | |
| 7,103,650 B1 | 9/2006 | Vetrivelkumaran et al. | |
| 7,154,884 B2 | 12/2006 | Dove et al. | |
| 7,194,538 B1 | 3/2007 | Rabe et al. | |
| 7,292,531 B1 | 11/2007 | Hill | |
| 7,293,109 B2 | 11/2007 | Ott et al. | |
| 7,295,566 B1 | 11/2007 | Chiu et al. | |
| 7,328,260 B1 | 2/2008 | Muthiyan et al. | |
| 7,339,936 B2 | 3/2008 | Valadarsky et al. | |
| 7,415,207 B2 | 8/2008 | Lanzone et al. | |
| 7,430,161 B2 | 9/2008 | Hidaka | |
| 7,463,637 B2 | 12/2008 | Bou-Diab et al. | |
| 7,475,274 B2 | 1/2009 | Davidson | |
| 7,483,438 B2 | 1/2009 | Serghi et al. | |
| 7,486,698 B2 | 2/2009 | Betts et al. | |
| 7,505,413 B2 | 3/2009 | Gous | |
| 7,512,125 B2 | 3/2009 | Betts et al. | |
| 7,561,571 B1 | 7/2009 | Lovett et al. | |
| 7,570,585 B2 | 8/2009 | DePaul et al. | |
| 7,570,587 B1 | 8/2009 | Wilson et al. | |
| 7,593,607 B2 | 9/2009 | Beshai et al. | |
| 7,849,225 B2 | 12/2010 | Schofield et al. | |
| 7,864,773 B2* | 1/2011 | Ah Sue | 370/395.1 |
| 7,957,269 B2* | 6/2011 | Tu et al. | 370/220 |
| 2001/0015978 A1 | 8/2001 | Blanset et al. | |
| 2001/0031111 A1 | 10/2001 | Irwin | |
| 2002/0080445 A1 | 6/2002 | Falkenstein et al. | |
| 2002/0101818 A1 | 8/2002 | Teixeira | |
| 2002/0101864 A1 | 8/2002 | Teixeira | |
| 2002/0106075 A1 | 8/2002 | Foss et al. | |
| 2002/0168054 A1 | 11/2002 | Klos et al. | |
| 2002/0181475 A1 | 12/2002 | Dove et al. | |
| 2002/0191777 A1 | 12/2002 | Milbrandt et al. | |
| 2003/0120817 A1 | 6/2003 | Ott et al. | |
| 2003/0231744 A1 | 12/2003 | Grosse-Boes et al. | |
| 2004/0076284 A1 | 4/2004 | Baker et al. | |
| 2004/0120508 A1 | 6/2004 | Sajadi et al. | |
| 2004/0217881 A1 | 11/2004 | Pedyash et al. | |
| 2004/0228468 A1 | 11/2004 | Cook | |
| 2005/0074021 A1 | 4/2005 | Bossemeyer, Jr. et al. | |
| 2005/0152340 A1 | 7/2005 | Voit et al. | |
| 2005/0195584 A1 | 9/2005 | AbuGhazaleh et al. | |
| 2007/0211642 A1 | 9/2007 | Franzke et al. | |
| 2007/0211740 A1 | 9/2007 | Franzke et al. | |
| 2007/0211882 A1 | 9/2007 | Hatte et al. | |
| 2007/0211883 A1 | 9/2007 | Franzke et al. | |
| 2008/0059651 A1 | 3/2008 | Ashwood Smith | |
| 2008/0266049 A1 | 10/2008 | Franzke | |

FOREIGN PATENT DOCUMENTS

| | | |
|---|---|---|
| EP | 0 858 221 A2 | 8/1998 |
| EP | 1 229 745 A2 | 8/2002 |
| WO | WO 01/20922 A1 | 3/2001 |
| WO | WO 02/03594 A2 | 1/2002 |
| WO | WO 2005/091613 A1 | 9/2005 |
| WO | WO 2006/063951 A1 | 6/2006 |
| WO | WO 2006/122698 A1 | 11/2006 |
| WO | WO 2006/122699 A1 | 11/2006 |
| WO | WO 2007/060196 A1 | 5/2007 |

OTHER PUBLICATIONS

Prosecution History of U.S. Appl. No. 11/503,861 (OA Oct. 29, 2009; Resp. Mar. 1, 2010; Final OA Jun. 22, 2010; Resp. Oct. 22, 2010).

Prosecution History of U.S. Appl. No. 11/503,653 (OA Oct. 1, 2009; Resp. Feb. 1, 2010; Final OA May 17, 2010; Resp. Oct. 22, 2010).

Prosecution History of U.S. Appl. No. 11/503,849 (OA Mar. 6, 2009; Resp. Sep. 8, 2009; Final OA Mar. 17, 2010; Resp Sep. 17, 2010).

Prosecution History of U.S. Appl. No. 11/503,667 (OA Oct. 29, 2009; Resp. Mar. 1, 2010; Final OA Jun. 16, 2010).

Prosecution History of U.S. Appl. No. 11/503,861 (OA Feb. 22, 2011), 25 pgs.

Prosecution History of U.S. Appl. No. 11/503,653 (OA Jan. 26, 2011), 16 pgs.

Prosecution History of U.S. Appl. No. 11/503,667 (Resp. Dec. 16, 2010; OA Apr. 1, 2011; Resp. Sep. 1, 2011; Final OA Sep. 30, 2011, 92 pgs.

Prosecution History of U.S. Appl. No. 11/503,861 (Resp. Jun. 22, 2011; Final OA Aug. 24, 2011), 42 pgs.

Prosecution History of U.S. Appl. No. 11/503,653 (Resp. Jun. 27, 2011; Final OA Aug. 25, 2011), 33 pgs.

Prosecution History of U.S. Appl. No. 11/914,680 (OA Sep. 7, 2011), 14 pgs.

* cited by examiner

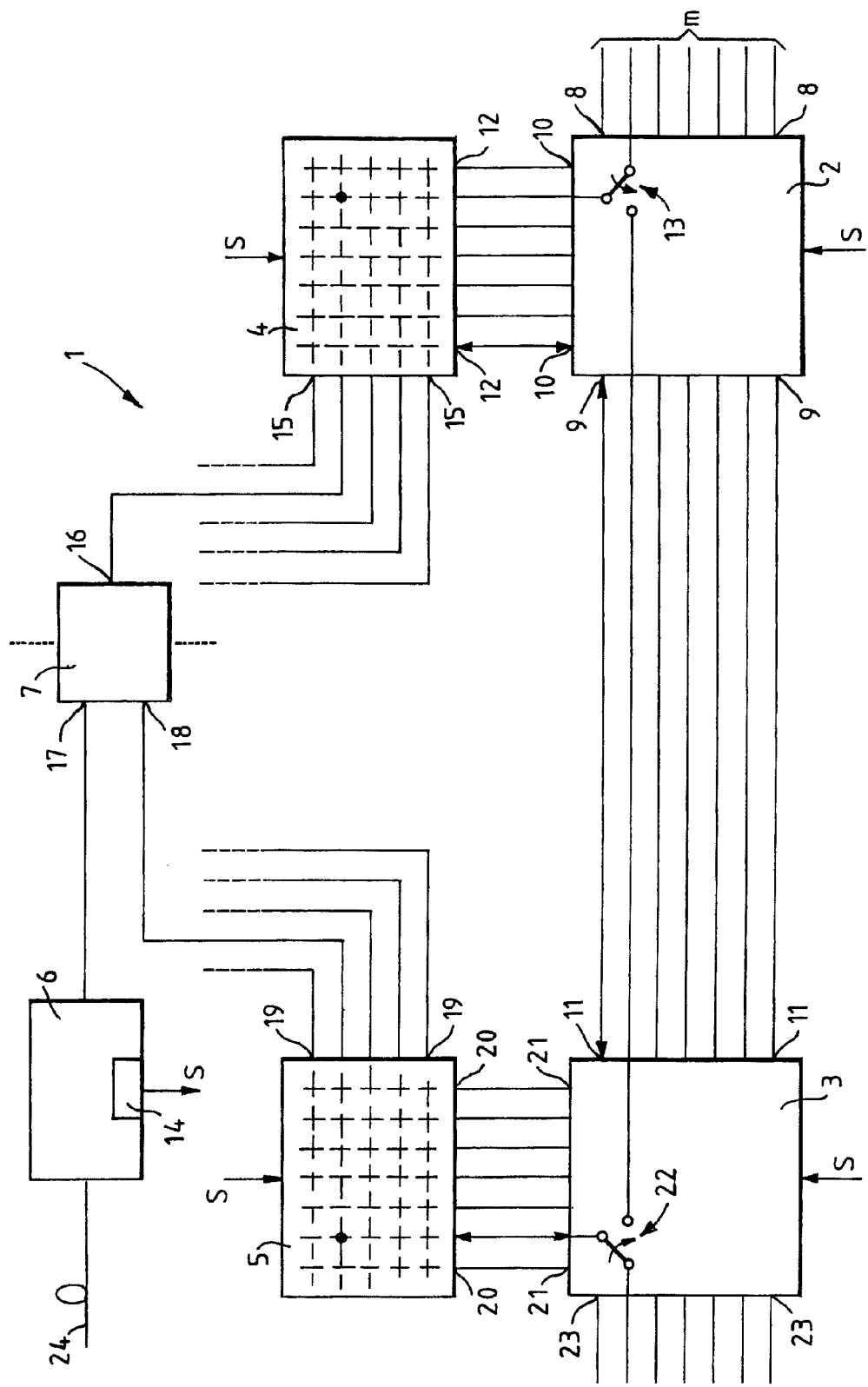

DISTRIBUTION DEVICE IN A SUBSCRIBER CONNECTION AREA

The invention relates to a distribution device in the subscriber access area, in particular in cable junction boxes, splice boxes or terminal boxes.

Distribution devices in the subscriber access area are physically located between a switching center and the subscriber. Typical installation sites are cable junction boxes, splice boxes or terminal boxes.

Broadband data transmission via telephone lines has become increasingly important. The system providers therefore face the technical problem of how to provide these broadband services to an increasing number of subscribers in a flexible manner. Approaches to a solution for this are known in which a DSLAM and its associated splitters are integrated in the distribution device in the subscriber access area, with the jumpering which is then necessary being performed manually. However, this is very time-consuming since some of the individual distribution devices are scattered far and wide.

The invention is therefore based on the technical problem of providing a distribution device in the subscriber access area which improves the availability of broadband data services.

To this end, the distribution device in the subscriber access area comprises two changeover devices, two switching matrices, a DSLAM having associated splitter modules, and at least one controller, in which the first changeover device comprises m inputs, m first outputs and m second outputs, with a first and a second output having one associated changeover element by means of which an associated input can be selectively connected to the first or to the second output, the second changeover device comprises m first inputs, m second inputs and m outputs, with a first input and a second input having one associated changeover element by means of which an associated output can be selectively connected to the first or to the second input, the first switching matrix has m inputs and n outputs, and the second switching matrix has n inputs and m outputs, where n<m, the inputs of the first changeover device can be connected to a switching center, the first outputs of the first changeover device are connected to the first inputs of the second changeover device, and the second outputs of the first changeover device are connected to the inputs of the first switching matrix, the second inputs of the second changeover device are connected to the outputs of the second switching matrix, and the outputs of the second changeover device can be connected to subscriber lines, the splitter modules have POTS connections, data connections and POTS/data connections, with the outputs of the first switching matrix being connected to the POTS connections, the data connections being connected to the DSLAM, and the POTS/data connections being connected to the inputs of the second switching matrix, and the controller switches the first and second changeover devices and switching matrices. It should be noted here that the inputs of the first changeover device do not have to be connected directly to the switching center, and the outputs of the second changeover device do not have to be connected directly to the subscribers. It should also be noted that the flow of information is bidirectional. The terms input and output have therefore been chosen for a flow of information from the switching center to the subscriber for simplicity.

The advantage of the invention is that a broadband data service is automatically allocated to a subscriber by switching over the changeover devices or switching matrices. In the basic state, the two changeover devices are switched in such a way here that the signals from the first output of the first changeover device to the first input of the second changeover device are switched-through to the output of the second changeover device. If a subscriber then wants a broadband data service, such as VDSL, the associated input of the subscriber is connected to the second output in the first changeover device. The second input of the second changeover device is accordingly connected to the associated output. Furthermore, an as yet unused XDSL channel is selected and is connected to the associated input of the first switching matrix or to the associated output of the second switching matrix via the two switching matrices. This is possible because each input of the switching matrix can be connected to each output of the switching matrix by means of the switching matrix. A broadband data service can thus be automatically allocated to a subscriber by remote control without manual jumpering. The percentage of possible allocations is defined here by the n/m ratio of the switching matrices, although these may be replaced as required. Overall, this produces a very simple system which can be easily modularly upgraded. One further advantage is that the basic services can also be jumpered by means of the distribution device. For this purpose, an input, which is associated with a subscriber, of the first changeover device is connected to the second output of the first changeover device, associated with a free output of the switching matrix by means of the first switching matrix, and fed into the second switching matrix by means of the splitter. Any second input and thus also output of the second changeover device can then be selected by means of the second switching matrix.

In one preferred embodiment, the controller is a constituent part of the DSLAM. This DSLAM already has controllers which can then be used simultaneously to control the switching matrices and changeover devices.

In one further embodiment, the changeover elements of the changeover device are in the form of relays. These relays have the advantage of being very reliable and having good transmission characteristics. However, microelectronic or micromechanical switches are also feasible in principle.

In one further preferred embodiment, the relays are in the form of bistable or monostable changeover switches. The advantage of the monostable embodiment is that the POTS signals can continue to be switched if the electrical power supply for the distribution device fails. In contrast, the advantage of the bistable embodiment is that the configurations, that is to say the allocation of the broadband services to the subscribers, are maintained.

The invention is explained in greater detail in the text which follows with reference to a preferred exemplary embodiment. The single FIGURE shows a schematic block diagram of a distribution device in the subscriber access area.

The distribution device 1 in the subscriber access area comprises two changeover devices 2, 3, two switching matrices 4, 5, a DSLAM 6 and a number of splitter modules 7. The first changeover device 2 comprises m inputs 8, m first outputs 9 and m second outputs 10. The inputs 8 of the first changeover device 2 are connected to wires or cables from or to a switching center (not illustrated). For this purpose, the inputs 8 are preferably in the form of multipole plug connectors. The first outputs 9 are connected to first inputs 11 of the second changeover device 3. The second outputs 10 are connected to inputs 12 of the first switching matrix 4, with the first switching matrix 4 likewise having m inputs 12. The first changeover device 2 comprises m changeover elements 13 by means of which an input 8 can be selectively connected to its associated first output 9 or second output 10. In this case, the changeover elements 13 are preferably in the form of bistable changeover relays. The changeover elements 13 are switched here by a control signal S which is generated by a controller 14 of the DSLAM 6. The n outputs 15 of the first switching matrix 4 are connected to n splitter modules 7, with only one splitter module 7 being illustrated, for reasons of clarity. In this case, the splitter modules 7 are preferably arranged together in groups on a printed equipment card. The outputs 15 are connected to the POTS connections 16 of the splitter modules 7, while the data connections 17 of the splitter modules 7 are connected to the DSLAM 6. The POTS/data connections 18 of the splitter modules 7 are connected to the n inputs 19 of the second switching matrix 5. The outputs 20 of the second switching matrix 5 are then connected to the second inputs 21 of the second changeover device 3. The second changeover device 3 likewise comprises changeover elements 22 by means of which the associated first input 11 or second input 21 can each be selectively connected to the associated output 23 of the changeover device 3. The outputs 23 are then connected to wires or cables which lead to the subscribers, with the outputs 23 preferably being in the form of multipole plug connectors, like the inputs 8 of the first changeover device 2. Each input 12, 19 can be connected to each output 15, 20 by means of the switching matrices 4, 5.

As can be seen, the first changeover device 2 and the first switching matrix 4 have mirror-image symmetry with respect to the second changeover device 3 and the second switching matrix 5, so that identical components can be used here.

The process of a subscriber switching from a pure POTS service to an enhanced service will now be briefly explained in more detail. In the basic state, the m inputs 8 of the first changeover device are connected to the m first outputs 9, and the m first inputs 11 of the second changeover device 3 are connected to the m outputs 23 of the second changeover device 3, that is to say the subscribers are provided with only a POTS service. If a subscriber then additionally wishes to take advantage of a broadband service, his input 8 is connected to its associated second output 10. At the first switching matrix 4, the associated input 12, which is connected to the output 10, is then connected to an output 15, which is connected to an unused splitter module 7, of the switching matrix 4. An association between the subscriber and the splitter module 7 is then formed in the DSLAM 6, so that the broadband data (e.g. XDSL) arriving via a glass-fiber cable 24 is then transmitted to the subscriber of the associated splitter module 7. In the splitter module 7, the POTS and data signals are combined in the signal direction toward the subscriber, and the signal is separated into POTS and data signals in the direction toward the switching center. The associated POTS/data connection 18 of the splitter module 7 is connected to an associated input 19 of the second switching matrix 5. This input 19 is then connected to the second input 21, which is associated with the subscriber, of the changeover device 3 by means of the switching matrix 5. The second input 21 is accordingly connected to the output 23 by the changeover element 22. A broadband data service can thus be allocated to a subscriber without manual jumpering. In addition to this automatic allocation of broadband data services, the distribution device also allows automatic jumpering of the subscriber lines themselves. For example, if a subscriber moves, his input 8 can be associated with another second input 21 of the second changeover device 3 by means of the two switching matrices 4, 5. If the outputs 23 of the subscribers j, k are to be exchanged for example, the two associated inputs 8 are connected to the second outputs 10 and associated with the other respective inputs 21 by means of the second switching matrix, each of these inputs then being switched-through to the output 23 by the changeover elements 22.

LIST OF REFERENCE SYMBOLS

1 Distribution device
2 Changeover device
3 Changeover device
4 Switching matrix
5 Switching matrix
6 DSLAM
7 Splitter module
8 Inputs
9 First outputs
10 Second outputs
11 First inputs
12 Inputs
13 Changeover elements
14 Controller
15 Outputs
16 POTS connections
17 Data connections
18 POTS/data connections
19 Inputs
20 Outputs
21 Second inputs
22 Changeover elements
23 Outputs
24 Glass-fiber cable
S Control signal

The invention claimed is:

1. A distribution device in the subscriber access area, comprising two changeover devices, two switching matrices, a DSLAM adapted to be connected only to a data service and having associated splitter modules, and at least one controller, in which the first changeover device comprises m inputs, m first outputs and m second outputs, with a first and a second output having one associated changeover element by means of which an associated input can be selectively connected to the first or to the second output, and wherein the associated input is adapted to be connected only to a POTS service, the second changeover device comprises m first inputs, m second inputs and m outputs, with a first input and a second input having one associated changeover element by means of which an associated output can be selectively connected to the first or to the second input, the first switching matrix has m inputs and n outputs, and the second switching matrix has n inputs and m outputs, where n<m, the inputs of the first changeover device can be connected to a switching center, the first outputs of the first changeover device are connected directly to the first inputs of the second changeover device, and the second outputs of the first changeover device are connected only to the inputs of the first switching matrix, the second inputs of the second changeover device are connected only to the outputs of the second switching matrix, and the outputs of the second changeover device are connected directly to subscriber lines, the splitter modules have POTS connections, data connections and POTS/data connections, with the outputs of the first switching matrix being connected to the POTS connections, the data connections being connected to the DSLAM, and the POTS/data connections being connected to the inputs of the second switching matrix, and the controller switches the first and second changeover devices and switching matrices between a basic state and an enhanced state by sending a signal to both of the first changeover device and the second changeover device, wherein when in the basic state, the associated input of the first changeover device is directly connected to the first output of the first changeover device via the one associated changeover element of the first changeover device, and where the first input of the second changeover device is directly connected to the associated output of the second changeover device via the one associated changeover element of the second changeover device, such that a subscriber receives only the POTS service in the basic state, and wherein when in the enhanced state, the associated input of the first changeover device is directly connected to the second output of the first changeover device via the one associated changeover element of the first changeover device, and where the second output of the first changeover device is connected to the second input of the second changeover device via the first switching matrix, at least one of the splitter modules, and the second switching matrix, and where the second input of the second changeover device is directly connected to the associated output of the second changeover device via the one associated changeover element of the second changeover device, such that the subscriber receives a POTS/data service in the enhanced state, wherein a POTS component of the POTS/data service is not routed from the first output of the first changeover device to the first input of the second changeover device.

2. The distribution device as claimed in claim 1, wherein the controller is a constituent part of the DSLAM.

3. The distribution device as claimed in claim 1, wherein the changeover elements of the changeover devices are in the form of relays.

4. The distribution device as claimed in claim 3, wherein the relays are in the form of bistable or monostable changeover switches.

5. A distribution device in the subscriber access area, comprising two changeover devices, two switching matrices, a DSLAM adapted to be connected only to a data service and having associated splitter modules, and at least one controller, in which the first changeover device comprises m inputs, first outputs and second outputs, with the first changeover device having switches by which the inputs can be selectively connected to the first or to the second outputs, and wherein at least one of the inputs is adapted to be connected only to a POTS service, the second changeover device comprises first inputs, second inputs and outputs, with the second changeover device having switches by which the outputs can be selectively connected to the first or to the second inputs, and the first and second switching matrixes having inputs and outputs, the inputs of the first changeover device can be connected to a switching center, the first outputs of the first changeover device are connected directly to the first inputs of the second changeover device, and the second outputs of the first changeover device are connected only to the inputs of the first switching matrix, the second inputs of the second changeover device are connected only to the outputs of the second switching matrix, and the outputs of the second changeover device are connected directly to subscriber lines, the splitter modules have POTS connections, data connections and POTS/data connections, with the outputs of the first switching matrix being connected to the POTS connections, the data connections being connected to the DSLAM, and the POTS/data connections being connected to the inputs of the second switching matrix, and the controller switches the first and second changeover devices and switching matrices between a basic state and an enhanced state by sending a signal to both of the first changeover device and the second changeover device, wherein when in the basic state, the associated input of the first changeover device is directly connected to the first output of the first changeover device via the one associated changeover element of the first changeover device, and where the first input of the second changeover device is directly connected to the associated output of the second changeover device via the one associated changeover element of the second changeover device, such that in a basic state, a subscriber receives only the POTS service via the first changeover device and the second changeover device, and wherein when in the enhanced state, the associated input of the first changeover device is directly connected to the second output of the first changeover device via the one associated changeover element of the first changeover device, and where the second output of the first changeover device is connected to the second input of the second changeover device via the first switching matrix, at least one of the splitter modules, and the second switching matrix, and where the second input of the second changeover device is directly connected to the associated output of the second changeover device via the one associated changeover element of the second changeover device, such that the subscriber receives a POTS/data service in the enhanced state, wherein a POTS component is routed via the second output of the first changeover device and the first switching matrix and joins the data component at the splitter.

* * * * *